United States Patent
Busch et al.

(10) Patent No.: US 7,410,675 B2
(45) Date of Patent: Aug. 12, 2008

(54) TRANSPARENT, BIAXIALLY ORIENTATED POLYOLEFINIC FILM WITH IMPROVED BONDING PROPERTIES

(75) Inventors: Detlef Busch, Saarlouis (DE); Joachim Jung, Neunkirchen (DE)

(73) Assignee: Trespaphan GmbH, Neunkirchen (DE)

( * ) Notice: Subject to any disclaimer, the term of this patent is extended or adjusted under 35 U.S.C. 154(b) by 0 days.

(21) Appl. No.: 10/275,512

(22) PCT Filed: May 9, 2001

(86) PCT No.: PCT/EP01/05259

§ 371 (c)(1),
(2), (4) Date: Nov. 5, 2002

(87) PCT Pub. No.: WO01/85447

PCT Pub. Date: Nov. 15, 2001

(65) Prior Publication Data

US 2003/0104125 A1    Jun. 5, 2003

(30) Foreign Application Priority Data

May 9, 2000    (DE) ................................ 100 22 306

(51) Int. Cl.
*B05D 3/06* (2006.01)
*B05D 3/08* (2006.01)
*B05D 3/14* (2006.01)

(52) U.S. Cl. ................... 427/536; 427/539; 427/540; 427/491; 427/224

(58) Field of Classification Search ................. 427/534, 427/536, 537, 538, 539, 540, 223, 224, 207.1, 427/412.3, 404, 250, 566, 355, 356, 358
See application file for complete search history.

(56) References Cited

U.S. PATENT DOCUMENTS

| | | | | |
|---|---|---|---|---|
| 3,433,777 A | * | 3/1969 | Brunson | |
| 4,615,906 A | * | 10/1986 | Kolbe et al. | 427/536 |
| 4,673,619 A | * | 6/1987 | Itaba et al. | 428/338 |
| 4,714,735 A | * | 12/1987 | Hodgson et al. | 524/514 |
| 4,929,319 A | * | 5/1990 | Dinter et al. | |
| 4,960,637 A | * | 10/1990 | Biczenczuk | 428/314.4 |
| 5,153,074 A | * | 10/1992 | Migliorini | 428/463 |
| 5,165,988 A | * | 11/1992 | Schaefer | 428/220 |
| 5,223,852 A | * | 6/1993 | Oresti et al. | 427/223 |
| 5,292,561 A | * | 3/1994 | Peiffer et al. | 428/35.1 |
| 5,346,763 A | | 9/1994 | Ballonie et al. | |
| 5,407,611 A | * | 4/1995 | Wilhoit et al. | 264/483 |
| 5,491,023 A | | 2/1996 | Tsai et al. | |
| 5,529,843 A | * | 6/1996 | Dries et al. | 428/336 |
| 5,777,055 A | * | 7/1998 | Peiffer et al. | 526/348.1 |
| 6,071,598 A | * | 6/2000 | Peiffer et al. | 428/213 |
| 6,083,336 A | * | 7/2000 | Kiriazis | 156/209 |
| 6,217,687 B1 | * | 4/2001 | Shibata et al. | 427/533 |
| 6,444,750 B1 | * | 9/2002 | Touhsaent | 525/58 |
| 6,528,129 B1 | * | 3/2003 | Kondo | 427/536 |
| 6,635,340 B2 | * | 10/2003 | Peiffer et al. | 428/308.4 |
| 6,844,077 B2 | * | 1/2005 | Squier et al. | 428/457 |
| 6,863,934 B2 | * | 3/2005 | Iida et al. | 427/533 |
| 6,964,814 B2 | * | 11/2005 | Fujii et al. | 428/423.1 |
| 2002/0012781 A1 | * | 1/2002 | Beer et al. | 428/220 |
| 2002/0198331 A1 | * | 12/2002 | Nishihara et al. | 525/444 |
| 2004/0197578 A1 | * | 10/2004 | Sinsel et al. | 428/461 |
| 2006/0217490 A1 | * | 9/2006 | Lee et al. | 525/240 |
| 2007/0125898 A1 | * | 6/2007 | Mussig et al. | 242/522 |
| 2007/0160787 A1 | * | 7/2007 | Jansen et al. | 428/35.7 |

FOREIGN PATENT DOCUMENTS

| | | | |
|---|---|---|---|
| EP | 0774350 82 | * | 5/1997 |
| JP | 58 001523 A | | 3/1983 |
| WO | WO 00/09596 A1 | | 2/2000 |

\* cited by examiner

*Primary Examiner*—Marianne L Padgett
(74) *Attorney, Agent, or Firm*—ProPat, L.L.C.

(57) ABSTRACT

The invention relates to the use of a polyolefinic film, with at least one layer, which is made from polyolefinic polymers, whereby said polyolefinic film comprises a bonding layer as outer layer. Said bonding layer contains at least 50 wt. % based on the weight of the layer of a maleic anhydride modified polyolefin. The film is used for printing, metallising or coating.

2 Claims, No Drawings

TRANSPARENT, BIAXIALLY ORIENTATED POLYOLEFINIC FILM WITH IMPROVED BONDING PROPERTIES

The invention relates to a polyolefin film having improved adhesion properties, and to the use thereof.

BACKGROUND OF THE INVENTION

The prior art discloses processes for improving adhesion properties of polyolefin films, in particular polypropylene films. These films are usually plasma, flame or corona-treated on one or both surfaces during production. These processes increase the surface tension of the film and improve, for example, its printability, metallizability or adhesion to other coatings.

The disadvantage of these known processes is that the increased surface tension drops continuously after the film has been produced. By the time the film is processed, the surface tension has frequently dropped so much that a further surface treatment must be carried out before printing, metallization or other corresponding processing steps in order to ensure the desired good adhesive strength. Due to the subsequent treatment, however, the original values are no longer achieved. Correspondingly, the adhesion properties of these films or the adhesion properties achieved by this process are in need of improvement.

In order to improve the adhesive strength by other methods, films are provided with a topcoat of acrylates before processing or printing. Although these coatings ensure the desired service properties, they are, however, at the same time associated with additional working steps, which are economically unacceptable for many areas of application for cost reasons.

The object of the present invention was therefore to provide a polyolefin film which is distinguished by particularly good adhesion properties. In particular, good adhesion to waterbased printing inks is particularly desirable. The film should be economic and inexpensive to produce. The other film service properties required must not be impaired.

BRIEF DESCRIPTION OF THE INVENTION

This object is achieved by a film comprising a base layer with at least one adhesive layer which forms an outer layer of the film, where the adhesive layer comprises at least 50% by weight, based on the weight of the outer layer, of a maleic anhydride-modified polyolefin. The sub-claims indicate preferred embodiments of the invention.

DETAILED DESCRIPTION OF THE INVENTION

In accordance with the invention, the film comprises at least one base layer and an adhesive layer which forms an outer layer of the film. In general, the adhesive layer is applied to one surface of the base layer. If desired, any desired further top layer can be applied to the opposite surface of the base layer. In this way, three-layered embodiments with an adhesive layer as top layer are obtained. If desired, these three-layered embodiments can be modified by additional interlayers between the base layer and the outer top layers. In this way, four- and five-layered embodiments of the film according to the invention are obtained. All embodiments have in common the feature which is essential to the invention, that the adhesive layer forms at least one outer layer of the film.

This adhesive layer of the film generally comprises at least 50% by weight, preferably from 70 to 100% by weight, in particular from 80 to <100% by weight, in each case based on the layer, of a maleic anhydride-modified polyolefin, referred to as MAPO below. In addition to the MAPO, further constituents of the adhesive layer can be polyolefinic polymers built up from ethylene, propylene or butylene units. These polyolefins are present in an amount of from 0 to 50% by weight, preferably from 0 to 30% by weight, in particular from >0 to 20% by weight, in each case based on the adhesive layer. For the purposes of clear differentiation from the modified polyolefins, these unmodified polyolefins which are additionally present in the adhesive layer as mixture component are referred to below as polyolefin II. If desired, the adhesive layer additionally comprises conventional additives in effective amounts in each case.

Polyolefins II are, for example, polyethylenes, polypropylenes, polybutylenes orcopolymers of olefins having from two to eight carbon atoms, of which polyethylenesand polypropylenes are preferred. Polypropylene. are homopolymers comprisingpropylene units or copolymers, which also includes terpolymers, which are built uppredominantly from propylene units; they generally -comprise at least 50% by weight,preferably from 70 to 99 % by weight, of propylene units, based on the propylenecopolymer.

In general, the propylene polymer comprises at least 90% by weight, preferably from 94 to 100% by weight, in particular from 98 to 100% by weight, of propylene units. The corresponding comonomer content of at most 10% by weight or from 0 to 6% by weight or from 0 to 2% by weight respectively generally consists, if present, of ethylene and butylene. The data in % by weight are in each case based on the propylene homopolymer.

If desired, the polyolefin II employed can be isotactic propylene homopolymers having a melting point of from 140 to 170° C., preferably from 155 to 165° C., and a melt flow index (measurement in accordance with DIN 53 735 at a load of 21.6 N and 230° C.) of from 1.0 to 10 g/10 min, preferably from 1.5 to 6.5 g/10 min. The n-heptane-soluble content of the isotactic propylene homopolymers is generally from 1 to 10% by weight, preferably 2-5% by weight, based on the starting polymer.

The polyolefins II employed in the adhesive layer together with the MAPO are preferably copolymers or terpolymers, preferably copolymers of ethylene and propylene or ethylene and butylene or propylene and butylene or terpolymers of ethylene and propylene and butylene, or mixtures of two or more of the said copolymers and terpolymers.

In particular, the polyolefin II are random ethylene-propylene copolymers having an ethylene content of from 1 to 10% by weight or random propylene-1-butylene copolymers having a butylene content of from 2 to 25% by weight, in each case based on the total weight of the copolymer, or random ethylene-propylene-1-butylene terpolymers having an ethylene content of from 1 to 10% by weight and a 1-butylene content of from 2 to 20% by weight, in each case based on the total weight of the terpolymer, or a blend of ethylene-propylene-1-butylene terpolymers and propylene-1-butylene copolymers, where the blend has an ethylene content of from 0.1 to 7% by weight, a propylene content of from 50 to 90% by weight and a 1-butylene content of from 10 to 40% by weight, in each case based on the total weight of the polymer blend.

The above-described copolymers and/or terpolymers employed in the adhesive layer(s) generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All melt flow indices indicated above are measured at 230° C. and a force of 21.6 N (DIN 53 735).

The molecular weight distribution of the above-described polyolefins II can vary in broad limits depending on the area of application. The ratio between the weight average molecular weight $M_w$ and the number average molecular weight $M_n$ is generally between 1 and 15, preferably in the range from 2 to 10. A molecular weight distribution of this type is achieved, for example, by peroxidic degradation or by preparation of the polyolefin by means of suitable metallocene catalysts.

Maleic acid-modified polyolefins are polyolefins which are hydrophilized through incorporation of maleic acid units. These modified polyolefins are known per se in the prior art and are also known as crafted polymers. The modification is carried out by reaction of the polyolefins with maleic anhydride by suitable processing steps. These processes are also known per se in the prior art.

The base polyolefins used for the reaction with maleic anhydride can in principle be the above-described polyolefins II, where, for the purposes of the present invention, propylene homopolymers or propylene copolymers or propylene terpolymers built up predominantly from propylene units generally comprising at least 50% by weight, preferably from 70 to 99% by weight, of propylene units, based on the propylene copolymer, are preferred as base polymers for the modification. The preparation of these maleic anhydride-modified polypropylenes is known per se in the prior art and is described, for example, in U.S. Pat. Nos. 3,433,777 and 4,198,327.

The density, in accordance with ASTM D 1505, of the modified polyolefins, preferably modified propylene polymers, is preferably in a range from 0.89 to 0.92, in particular 0.9, the Vicat softening point in accordance with ASTM 1525 is in a range of from 120 to 150° C., in particular from 140 to 145° C., the Shore hardness in accordance with ASTM 2240 is from 55 to 70, preferably 67° C., and the melting point in accordance with ASTM D 2117 is in a range of from 140 to 165° C., preferably from 150 to 165° C., in particular from 155 to 160° C. The maleic acid content in the modified polyolefin, preferably propylene polymer, is generally less than 5%, based on the modified polyolefin, preferably in the range from 0.05 to 3%, in particular from 0.1 to 1%. The melt flow index is generally from 1 to 20 g/10 min, preferably from 3 to 10 g/10 min.

The following propylene polymers are preferably employed for modification with maleic anhydride:

Isotactic propylene homopolymers having a melting point of from 140 to 170° C., preferably from 155 to 165° C., and a melt flow index (measurement in accordance with DIN 53 735 at a load of 21.6 N and 230° C.) of from 1.0 to 10 g/10 min, preferably from 1.5 to 6.5 g/10 min, are employed. The n-heptane-soluble content of the isotactic propylene homopolymers is generally from 1 to 10% by weight, preferably 2-5% by weight, based on the starting polymer.

Copolymers of ethylene and propylene or propylene and butylene or terpolymers of ethylene and propylene and butylene or mixtures of two or more of the said copolymers and terpolymers.

Particular preference is given to random ethylene-propylene copolymers having an ethylene content of from 1 to 10% by weight or random propylene-1-butylene copolymers having a butylene content of from 2 to 25% by weight, in each case based on the total weight of the copolymer, or random ethylene-propylene-1-butylene terpolymers having an ethylene content of from 1 to 10% by weight and a 1-butylene content of from 2 to 20% by weight, in each case based on the total weight of the terpolymer, or a blend of ethylene-propylene-1-butylene terpolymers and propylene-1-butylene copolymers, where the blend has an ethylene content of from 0.1 to 7% by weight, a propylene content of from 50 to 90% by weight and a 1-butylene content of from 10 to 40% by weight, in each case based on the total weight of the polymer blend.

The above-described copolymers and/or terpolymers employed for the modification generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All melt flow indices indicated above are measured at 230° C. and a force of 21.6 N (DIN 53 735).

The adhesive layer may, if desired, additionally comprise conventional additives, such as neutralizers, stabilizers, antistatics, antiblocking agents and/or lubricants, in effective amounts in each case.

It has been found that the surface of the adhesive layer is very well suited for surface treatment by means of plasma, flame or corona. The values achieved for the surface tensions are high, preferably in the range from 37 to 50 mN/m, in particular from 39 to 45 mN/m. Surprisingly, the values achieved in the case of in-line treatment can be achieved again if the film is surface-treated again immediately before the respective processing step. As a result, the film, owing to the adhesive layer, exhibits improved adhesion to printing inks and coatings, and can likewise be employed very well for metallization by means of vacuum vapour deposition.

The base layer of the polyolefin film is basically built up from the above-described polyolefins, of which preference is given to the propylene homopolymers described, in particular isotactic propylene homopolymers. In general, the base layer comprises from at least 70 to 100% by weight, preferably from 80 to <100% by weight, of polyolefin or propylene polymer. Furthermore, the base layer usually comprises neutralizers and stabilizers, and, if desired, further conventional additives in effective amounts in each case. For opaque or white-opaque embodiments of the film, the base layer additionally comprises vacuole-initiating fillers and/or pigments. The type and amount of the fillers are known in the prior art.

The thickness of the adhesive layer comprising modified polyolefin is greater than 0.1 μm and is preferably in the range from 0.3 to 3 μm, in particular from 0.4 to 1.5 μm.

If desired, the film may have further layers, preferably a second top layer, and, if desired, interlayers on one or both sides.

The interlayer(s) may consist of the α-polyolefins described for the base layer and, if desired, comprise conventional additives, such as antistatics, neutralizers, lubricants and/or stabilizers, and, if desired, antiblocking agents. The thickness of the interlayer(s), if present, is greater than 0.3 μm and is preferably in the range from 1.0 to 15 μm, in particular from 1.5 to 10 μm.

The total thickness of the polyolefin film according to the invention can vary within broad limits and depends on the intended use. It is preferably from 4 to 60 μm, in particular from 5 to 50 μm, preferably from 10 to 35 μm, with the layer making up from about 40 to 100% of the total film thickness.

The invention furthermore relates to a process for the production of the polyolefin film according to the invention by the coextrusion process, which is known per se.

This process is carried out by coextruding the melts corresponding to the individual layers of the film through a flat-film die, taking off the resultant film over one or more roll(s) for solidification, subsequently stretching (orienting) the film, heat-setting the stretched film and, if desired, corona or flame-treating the surface layer intended for the treatment.

Biaxial stretching (orientation) is carried out sequentially or simultaneously. The sequential stretching is generally carried out consecutively, with consecutive biaxial stretching, in which stretching is firstly carried out longitudinally (in the machine direction) and then transversely (perpendicular to the machine direction), being preferred. The simultaneous stretching can be carried out by the flat film process or by the film blowing process. The film production is described further using the example of flat film extrusion with subsequent sequential stretching.

Firstly, as is usual in the extrusion process, the polymer or the polymer mixture of the individual layers is compressed and liquefied in an extruder, that the laser pigments and any other additives optionally added may already be present in the polymer or polymer mixture. The melts are then forced simultaneously through a flat-film die (slot die), and the extruded multilayer film is taken off over one or more take-off rolls, during which it cools and solidifies.

The film obtained in this way is then stretched longitudinally and transversely to the extrusion direction, which results in alignment of the molecule chains. The longitudinal stretching is advantageously carried out with the aid of two rolls running at different speeds corresponding to the target stretching ratio, and the transverse stretching with the aid of an appropriate tenter frame. The longitudinal stretching ratios are in the range from 4 to 8, preferably from 5 to 6. The transverse stretching ratios are in the range from 5 to 10, preferably from 7 to 9.

The stretching of the film is followed by heat-setting (heat treatment) thereof, in which the film is held at a temperature from 100 to 160° C. for from about 0.1 to 10 seconds. The film is subsequently wound up in a conventional manner by means of a wind-up device.

It has proven particularly favourable to keep the take-off roll or rolls by means of which the extruded film is cooled and solidified at a temperature from 10 to 100° C., preferably from 20 to 50° C., by means of a heating and cooling circuit.

The temperatures at which longitudinal and transverse stretching are carried out can vary in a relatively broad range and depend on the desired properties of the film. In general, the longitudinal stretching is preferably carried out at from 80 to 150° C. and the transverse stretching is preferably carried out at from 120 to 170° C.

After the biaxial stretching, one or both surface(s) of the film is (are) preferably corona or flame-treated by one of the known methods. The treatment intensity is generally in the range from 37 to 50 mN/m, preferably from 39 to 45 mN/m.

The surface treatment of the film is described here using the example of corona treatment.

In the corona treatment, an advantageous procedure is to pass the film between two conductor elements serving as electrodes, with such a high voltage, usually an alternating voltage (from about 5 to 20 kV and from 5 to 30 kHz), being applied between the electrodes that spray or corona discharges are able to occur. Due to the spray or corona discharge, the air above the film surface ionises and reacts with the molecules of the film surface, causing the formation of polar inclusions in the essentially non-polar polymer matrix.

The corona treatment is preferably carried out in-line, i.e. during production of the film. It has been found that the film is, in accordance with the invention, highly suitable for further off-line treatment, which is preferably carried out just before printing, metallization or further processing of the film. It has been found that a plasma, corona or flame treatment of this type enables very high values for the surface tension to be achieved, which come close to the original values achieved by in-line treatment. The film is therefore particularly suitable for further processing.

The invention is now explained with reference to a working example:

EXAMPLE 1

A transparent three-layered film consisting of base layer B, a first top layer A and a second top layer C with a total thickness of 60 μm was produced by coextrusion followed by stepwise orientation in the longitudinal and transverse direction. The first top layer A had a thickness of 1.0 μm and the second top layer C had a thickness of 0.7 μm. The layers had the following compositions:

| Base layer B: | |
| --- | --- |
| 99.64% by weight | of propylene homopolymer having a melting point of 165° C. and a melt flow index of 3.4 g/10 min and a chain isotactic index of 94% |
| 0.10% by weight | of erucamide (lubricant) |
| 0.10% by weight | of ARMOSTAT ® 300 (antistatic) |
| 0.03% by weight | of neutralizer ($CaCO_3$) |
| 0.13% by weight | of stabilizer (IRGANOX ®) |
| Top layer A: | |
| 99.5% by weight | of maleic anhydride-modified polypropylene (POLYBOND ®) |
| 0.5% by weight | of $SiO_2$ as antiblocking agent having a mean particle size of 4 μm |
| Top layer C: | |
| 99.54% by weight | of random copolymer comprising ethylene and propylene having a melt flow index of 6.0 g/10 min and an ethylene content of 6% by weight, based on the copolymer |
| 0.22% by weight | of $SiO_2$ as antiblocking agent having a mean particle size of 4 μm |
| 0.20% by weight | of stabilizer (IRGANOX ® 1010/IRGAFOS ® 168) |
| 0.04% by weight | of neutralizer (Ca stearate) |

The production conditions in the individual process steps were as follows:

| Extrusion: | Temperatures | Base layer B: | 260° C. |
| --- | --- | --- | --- |
| | | Top layer A: | 230° C. |
| | | Top layer C: | 240° C. |
| | Temperature of the take-off roll: | | 20° C. |
| Longitudinal stretching: | Temperature: | | 100° C. |
| | Longitudinal stretching ratio: | | 1:4.5 |
| Transverse stretching: | Temperature: | | 165° C. |
| | Transverse stretching ratio: | | 1:9 |
| Setting: | Temperature: | | 140° C. |
| | Convergence: | | 10% |
| Pressure pre-treatment | Top layer A | | Corona 10,000 V/10,000 Hz |
| | Top layer C | | Corona 10,000 V/10,000 Hz |

The transverse stretching ratio of 1:9 is an effective value. This effective value is calculated from the final film width B reduced by twice the seam width b, divided by the width of the longitudinally stretched film C, likewise reduced by twice the seam width b.

Immediately after the in-line corona treatment, the film had a surface tension of 42 mN/m on the surface of the top layer A, which dropped to lower values in the course of storage time. A surface tension of 42 mN/m was achieved again by means of off-line corona after a storage time of 6 weeks. During subsequent printing by means of water-based printing inks, the film exhibited very good printing-ink adhesion.

COMPARATIVE EXAMPLE

A film was produced as described in Example 1. In contrast to Example 1, the top layer was not made from a modified polypropylene. The top layer A now had the same composition as the top layer C of Example 1.

A surface tension of 41 mN/m was achieved on the surface of the top layer A by means of in-line corona treatment. In the attempt to refresh the corona treatment after 6 weeks, a surface tension of only 38 mN/m was achieved. During subsequent printing by means of water-based printing inks, the film exhibited poor adhesion to the printing inks.

The following measurement methods were used to characterize the raw materials and the films:

Melt Flow Index

The melt flow index was measured in accordance with DIN 53 735 at a load of 21.6 N and 230° C.

Melting Point

DSC measurement, maximum of the melting curve, heating rate 20° C./min.

Surface Tension

The surface tension was determined by the so-called ink method (DIN 53 364).

Printability

The corona-treated films were printed. The ink adhesion was assessed by means of the adhesive-tape test. If little ink was removed by means of an adhesive tape, the ink adhesion was assessed as moderate, and if a significant amount of ink was removed, it was assessed as poor.

The invention claimed is:

1. Method for printing a co-extruded polyolefin film, said polyolefin film comprising a base layer and a first outer layer, both base and first outer layers having first and second surfaces, said first surface of said first outer layer disposed on said first surface of said base layer, wherein said base layer is built up from polyolefinic polymers and said first outer layer comprises a single polymer consisting entirely of a maleic anhydride-modified polyolefin, said method consisting essentially of
    applying a first surface treatment to said second surface of said first outer layer by plasma, corona or flame-treating said second surface of said first outer layer during film manufacturing;
    applying a second surface treatment to said second surface of said first outer layer by applying a plasma, corona or flame treatment to said second surface of said first outer layer subsequent to said first surface treatment; and
    printing the second surface of said first outer layer subsequent to said second surface treatment,
    wherein (i) the surface tension imparted by the first surface treatment is the same as the surface tension imparted by the second surface treatment,
    (ii) printing adhesion is enhanced by said first and second surface treatments alone,
    (iii) said film is formed using a longitudinal stretching ratio ranging from 4 to 8 and a transverse stretching ratio ranging from 5 to 10 and
    (iv) the surface tension imparted by the first and second surface treatments ranges from 42 to 50 mN/m.

2. Method according to claim 1, wherein the printing on the second surface of said first outer layer is carried out by means of water-based printing inks.

* * * * *